(12) United States Patent
Zhao (10) Patent No.: US 12,031,326 B2
(45) Date of Patent: Jul. 9, 2024

(54) STRUCTURAL ENERGY-SAVING, HEAT-INSULATED AND DECORATIVE INTEGRATED PLATE AND MANUFACTURING METHOD THEREFOR

(71) Applicant: CHANGDA CONSTRUCTION TECHNOLOGY CO., LTD., Jiaxing (CN)

(72) Inventor: Chengyun Zhao, Jiaxing (CN)

(73) Assignee: CHANGDA CONSTRUCTION TECHNOLOGY CO., LTD., Jiaxing (CN)

( * ) Notice: Subject to any disclaimer, the term of this patent is extended or adjusted under 35 U.S.C. 154(b) by 251 days.

(21) Appl. No.: 17/701,721

(22) Filed: Mar. 23, 2022

(65) Prior Publication Data

US 2023/0304284 A1   Sep. 28, 2023

(51) Int. Cl.
| | | |
|---|---|---|
| *E04B 2/86* | (2006.01) | |
| *C04B 16/06* | (2006.01) | |
| *C04B 18/06* | (2006.01) | |
| *C04B 28/02* | (2006.01) | |
| *E04C 2/38* | (2006.01) | |
| *C04B 111/40* | (2006.01) | |
| *E04C 2/00* | (2006.01) | |

(52) U.S. Cl.
CPC ........ *E04B 2/8647* (2013.01); *C04B 16/0666* (2013.01); *C04B 18/06* (2013.01); *C04B 28/02* (2013.01); *E04C 2/384* (2013.01); *C04B 2111/40* (2013.01); *C04B 2201/30* (2013.01); *C04B 2201/50* (2013.01); *E04B 2103/02* (2013.01); *E04B 2103/04* (2013.01); *E04C 2002/002* (2013.01)

(58) Field of Classification Search
CPC ... E04B 2/8647; C04B 16/0666; C04B 18/06; C04B 2111/40; C04B 2201/30; C04B 2201/50; E04C 2/384; E04C 2002/002
USPC ...... 52/125.2, 309.7, 309.12, 309.17, 309.14
See application file for complete search history.

(56) References Cited

U.S. PATENT DOCUMENTS

| | | | | |
|---|---|---|---|---|
| 2,655,710 A | * | 10/1953 | Burns ................. | B28B 23/0006 425/117 |
| 3,484,331 A | * | 12/1969 | Betz ......................... | E04C 2/22 52/309.7 |
| 5,417,023 A | * | 5/1995 | Mandish ................... | E04B 2/58 52/656.1 |

(Continued)

*Primary Examiner* — Brent W Herring (57) ABSTRACT

Provided are a structural energy-saving, heat-insulated and decorative integrated plate and a manufacturing method therefor. The method includes: step 1: welding outer side keels, an inner side keel and a bottom keel into a wall framework; step 2: fixing an inner side decorative plate and an outer side decorative plate on the wall framework through shoot nails, and a hollow structure formed by the inner side decorative plate, the outer side decorative plate and the wall framework being a filling and pouring layer; and step 3: grouting the filling and pouring layer, to form a wall filled with cement foamed polystyrene particles. The present invention features a rational structure, manufactures an integrated wall plate with decorated inner and outer sides, and can replace patterns on the decorative plates. The integrated plate features energy saving, environmental friendliness, shock resistance, compression resistance, fire prevention, heat insulation and sound insulation.

6 Claims, 3 Drawing Sheets

(56) References Cited

U.S. PATENT DOCUMENTS

| | | | | |
|---|---|---|---|---|
| 5,870,868 | A * | 2/1999 | Kita | E04C 2/384 |
| | | | | 403/231 |
| 6,006,480 | A * | 12/1999 | Rook | B32B 13/045 |
| | | | | 52/762 |
| 7,127,856 | B2 * | 10/2006 | Hagen, Jr. | E04B 1/7604 |
| | | | | 52/407.3 |
| 7,216,464 | B2 * | 5/2007 | Neal | A21B 1/24 |
| | | | | 110/336 |
| 7,513,082 | B2 * | 4/2009 | Johnson | E04B 2/7412 |
| | | | | 52/241 |
| 8,997,424 | B1 * | 4/2015 | Miller | E04B 1/08 |
| | | | | 52/656.1 |
| 2007/0209306 | A1 * | 9/2007 | Andrews | E04B 2/767 |
| | | | | 52/317 |
| 2013/0298492 | A1 * | 11/2013 | Hartmann | E04B 2/58 |
| | | | | 52/653.1 |
| 2020/0392731 | A1 * | 12/2020 | Sloane | E04C 2/46 |

\* cited by examiner

STRUCTURAL ENERGY-SAVING, HEAT-INSULATED AND DECORATIVE INTEGRATED PLATE AND MANUFACTURING METHOD THEREFOR

TECHNICAL FIELD

The present invention relates to the field of building materials, and in particular to a structural energy-saving, heat-insulated and decorative integrated plate and a manufacturing method therefor.

BACKGROUND ART

Currently, a wall with decorations is constructed as follows: 1. installing keels; 2. installing the wall; 3. painting (installing) the wall with a heat-insulated and waterproof layer; and 4. adding decorative surfaces. Such manufacture has multiple steps, with at least three times of manual treatment required on the same wall, as the construction is performed at a later stage, the decorative surfaces cannot be aligned with the original structure, making it impossible to ensure the construction precision.

The present invention provides a structural energy-saving, heat-insulated and decorative integrated plate and a manufacturing method therefor, thereby ensuring the construction precision. In addition, the inner side and the outer side of the structural energy-saving and decorative integrated plate are provided with decorative plates, the inner side keel is used for supporting, and further the integrated plate is grouted and filled with other materials. Since the steps are completed in a factory, the construction labor and waste are greatly reduced, so is the related environmental pollution. Moreover, the patterns on the inner side decorative plate and the outer side decorative plate can be replaced correspondingly according to the requirements of customers in the manufacturing process. The special wall poured between the inner side decorative plate and the outer side decorative plate is improved to utilize simple raw materials, so as to achieve better performance compared to a common wall, while significantly reducing the cost.

SUMMARY

An objective of the present invention is to provide a structural energy-saving, heat-insulated and decorative integrated plate and a manufacturing method therefor. An integrated type delivery mode avoids field construction. A prepared wall features heat insulation, and therefore, it requires no heat insulation treatment on an inner side decorative plate and an outer side decorative plate repeatedly, thereby reducing a cost. An entire plate body has advantages such as fire prevention, shock resistance, sound insulation, moisture prevention and energy saving.

The technical objective described above of the present invention is achieved through a technical solution as follows:

A structural energy-saving, heat-insulated and decorative integrated plate includes an outer side decorative plate, outer side keels, a bottom keel, a filling and pouring layer, a middle keel and an inner side decorative plate, the outer side decorative plate and the inner side decorative plate being symmetrically arranged, to form a hollow structure, two outer side keels being symmetrically arranged at two sides of the hollow structure formed by the outer side decorative plate and the inner side decorative plate, the middle keel being arranged in the middle of the hollow structure formed by the outer side decorative plate and the inner side decorative plate, the bottom keel being arranged on a bottom surface of the hollow structure formed by the outer side decorative plate and the inner side decorative plate, and the filling and pouring layer being arranged in the middle of the hollow structure formed by the outer side decorative plate and the inner side decorative plate.

Preferably, the filling and pouring layer is a wall filled with cement foamed polystyrene particles.

A manufacturing method for a structural energy-saving, heat-insulated and decorative integrated plate includes:
- step 1: welding outer side keels, an inner side keel and a bottom keel into a wall framework, the wall framework being capable of being of, according to a shape and a size of a wall, different structures;
- step 2: fixing an inner side decorative plate and an outer side decorative plate on a front side and a rear side of the wall framework respectively, the inner side decorative plate and the outer side decorative plate being capable of being fixed on the wall framework by means of shoot nails, or the inner side decorative plate and the outer side decorative plate being capable of being connected to the wall framework by means of connectors, and a hollow structure formed by the inner side decorative plate, the outer side decorative plate and the wall framework being a filling and pouring layer; and
- step 3: grouting the filling and pouring layer, to form a wall filled with cement foamed polystyrene particles, so that the wall, the inner side decorative plate, the outer side decorative plate and the wall framework may be fixed together after the wall is solidified.

Preferably, the wall filled with cement foamed polystyrene particles includes: 210 kg-250 kg of water, 280 kg-320 kg of cement, 100 kg-130 kg of coal ash, 45 kg-60 kg of coal gangue, 2 kg-5 kg of polystyrene particles, 8 kg-10 kg of foaming agents and 3 kg-5 kg of 801 glue. The wall is specifically manufactured as follows:
- step 1: adding the cement, the coal ash, the coal gangue, the polystyrene particles, the foaming agents and the 801 glue into the water at a normal temperature, and uniformly stirring same in a stirrer, to obtain viscous foamed concrete, a stirring speed being 200 r/min-350 r/min and a stirring time being 5 min-8 min; and step 2: filling the filling and pouring layer with the foamed concrete obtained in step 1, leaving same standing still for 1.5 h-2 h to achieve initial solidification, and leaving same standing still for over 24 h to obtain a high-strength integrated plate.

Preferably, the wall filled with cement foamed polystyrene particles includes: 360 kg-380 kg of water, 450 kg-500 kg of cement, 250 kg-300 kg of coal ash, 2 kg-5 kg of polystyrene particles, 8 kg-11 kg of foaming agents and 4 kg-6 kg of 801 glue. The wall is specifically manufactured as follows:
- step 1: adding the cement, the coal ash, the polystyrene particles, the foaming agents and the 801 glue into the water at a normal temperature, and uniformly stirring same in a stirrer, to obtain viscous foamed concrete, a stirring speed being 200 r/min-350 r/min and a stirring time being 6 min-15 min; and
- step 2: filling the filling and pouring layer with the foamed concrete obtained in step 1, leaving same standing still for 1.8 h-2.5 h to achieve initial solidification, and leaving same standing still for over 24 h to obtain a high-strength integrated plate.

Compared with the prior art, the structural energy-saving and decorative integrated board of the present invention features a simple structure. The specially-made foamed concrete is poured into the framework enclosed by the inner side decorative plate, the outer side decorative board, the inner side keel, the outer side keels and the bottom keel, and finally the framework is left standing still and curing for over 24 h, to form the integrated plate, thereby achieving a simple manufacture and a low cost. Each step is completed in a factory to avoid difficult field construction and low precision. Compared with concrete prepared by combining pure polystyrene particles with gel, the concrete prepared by combining the polystyrene particles with foaming has better workability, and it is easier to pour the concrete into the framework formed by the keels, the inner side decorative plate and the outer side decorative plate. The wall filled with the polystyrene particles realizes energy saving and environmental protection, and may save energy by over 65%-70%. Moreover, when a product cannot be used any more, the wall may be recycled upon complete pulverization. The concrete prepared by combining the polystyrene particles and the foaming has better durability than pure cement concrete, and may be used for over 50 years, which is consistent with the service life of a building structure. After detection, fire resistance of the wall filled with cement foamed polystyrene particles may satisfy the requirements of level A1, which also conforms to national standards. The wall density may depend on a proportion of materials, and the wall prepared in the material proportion described above is light in weight, with the maximum dry density of 1,141 kg per cubic meter, thereby greatly reducing the self weight of an entire integrated plate, the integrated plate is easy to transport and install, excellent in anti-shock effect and high in safety, and steel consumption of an entire structure may be reduced. The wall filled with cement foamed polystyrene particles has a thickness of 10 cm and can insulate sound over 48 dB, and the inner side decorative plate and the outer side decorative plate can also insulate sound about 30 dB, and a combination of the wall and the inner side decorative plate as well as the outer side decorative plate may insulate sound of 62 dB. A heat conduction coefficient of the wall (at an average temperature of 25° C.), a heat conduction coefficient of the inner side decorative plate and a heat conduction coefficient of the outer side decorative plate are all lower than 0.21, thereby realizing excellent heat insulation property. The polystyrene particles may be replaced, according to requirements of customers, with heat insulation cotton, so as to achieve an improved heat insulation effect. The cement foamed polystyrene particles are of a closed hole structure, with a closed hole rate of over 90%, a water absorption rate of below 3%, and excellent water repellency and moisture resistance.

REFERENCE NUMERALS 1. outer side decorative plate; 2. outer side keel; 31. joint device; 32, buckle; 4, filling and pouring layer; 5. middle keel; 6. inner side decorative plate; and 7. bottom keel.

DETAILED DESCRIPTION OF THE EMBODIMENTS

What is described above is merely the preferred implementation of the present invention. However, the scope of protection is not limited to these embodiments, and all technical solutions following the idea of the present invention should fall within the scope of protection of the present invention. It should be noted that several modifications and adaptations made by those of ordinary skill in the art without departing from the principle of the present invention should also fall within the scope of protection of the present invention.

Figure 1:
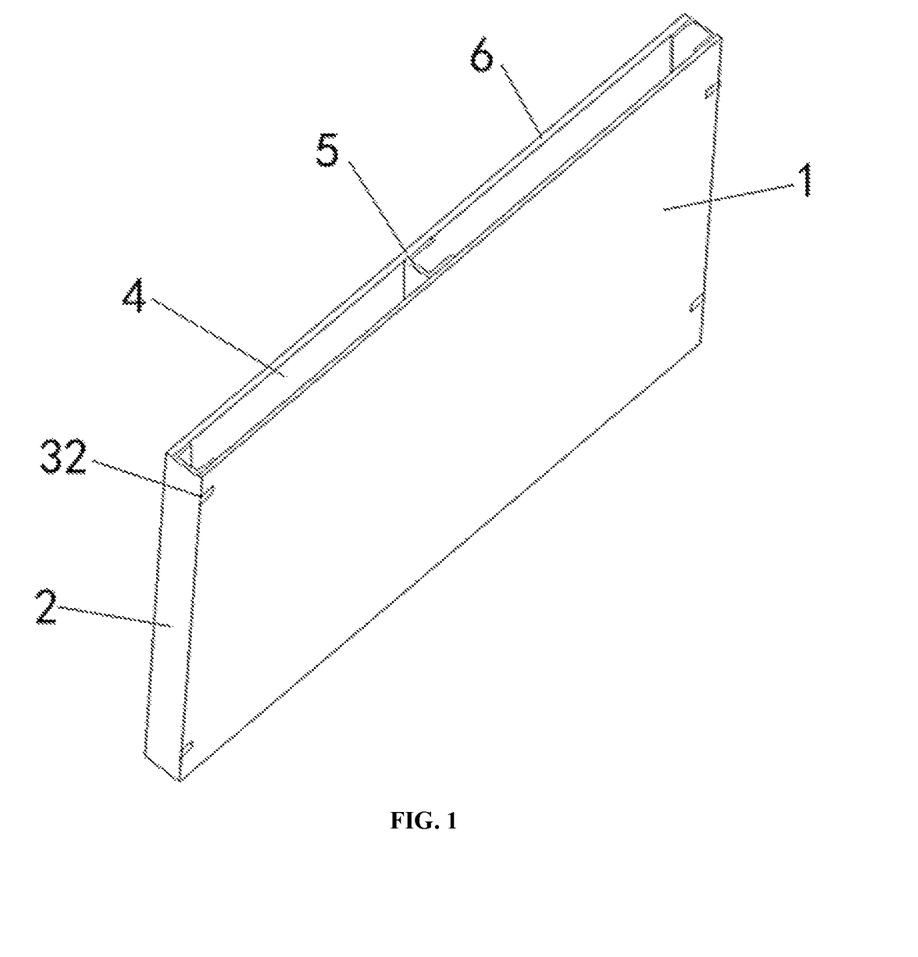
FIG. 1 is a structural schematic diagram of an embodiment.
Figure 2:
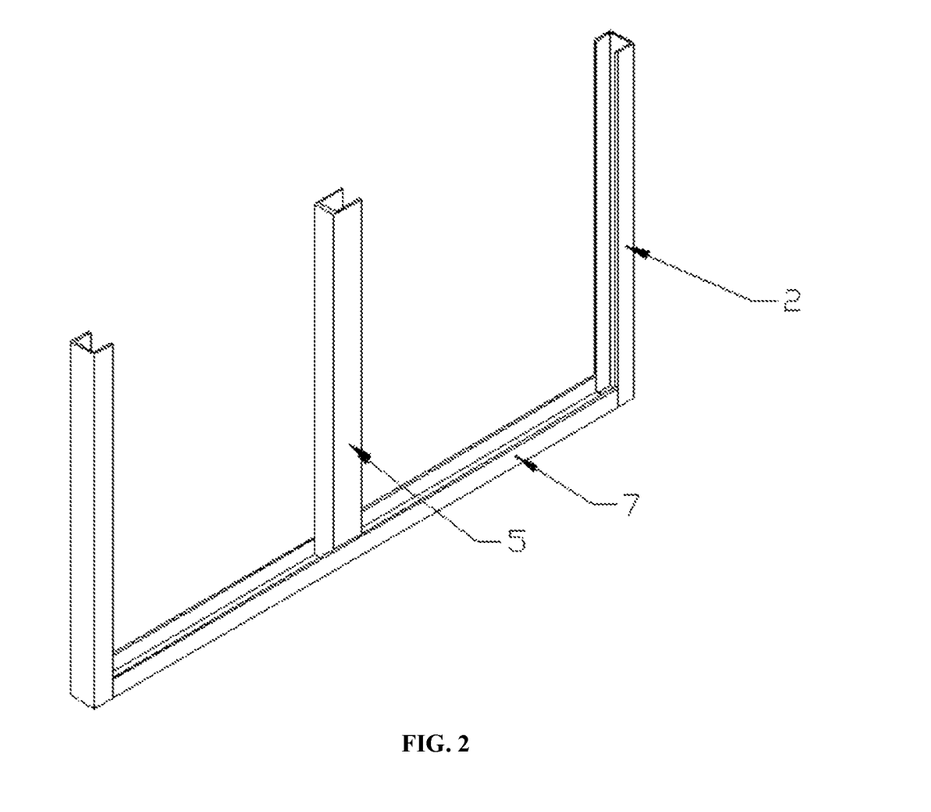
FIG. 2 is a structural schematic diagram of all keel compositions in the embodiment.

As shown in FIGS. 1-2, a structural energy-saving, heat-insulated and decorative integrated plate includes an outer side decorative plate, outer side keels, a bottom keel, a filling and pouring layer, a middle keel and an inner side decorative plate, the outer side decorative plate and the inner side decorative plate being symmetrically arranged, to form a hollow structure, two outer side keels being symmetrically arranged at two sides of the hollow structure formed by the outer side decorative plate and the inner side decorative plate, the middle keel being arranged in the middle of the hollow structure formed by the outer side decorative plate and the inner side decorative plate, the bottom keel being arranged on a bottom surface of the hollow structure formed by the outer side decorative plate and the inner side decorative plate, the filling and pouring layer being arranged in the middle of the hollow structure formed by the outer side decorative plate and the inner side decorative plate, and the filling and pouring layer being a wall filled with cement foamed polystyrene particles.

Figure 3:
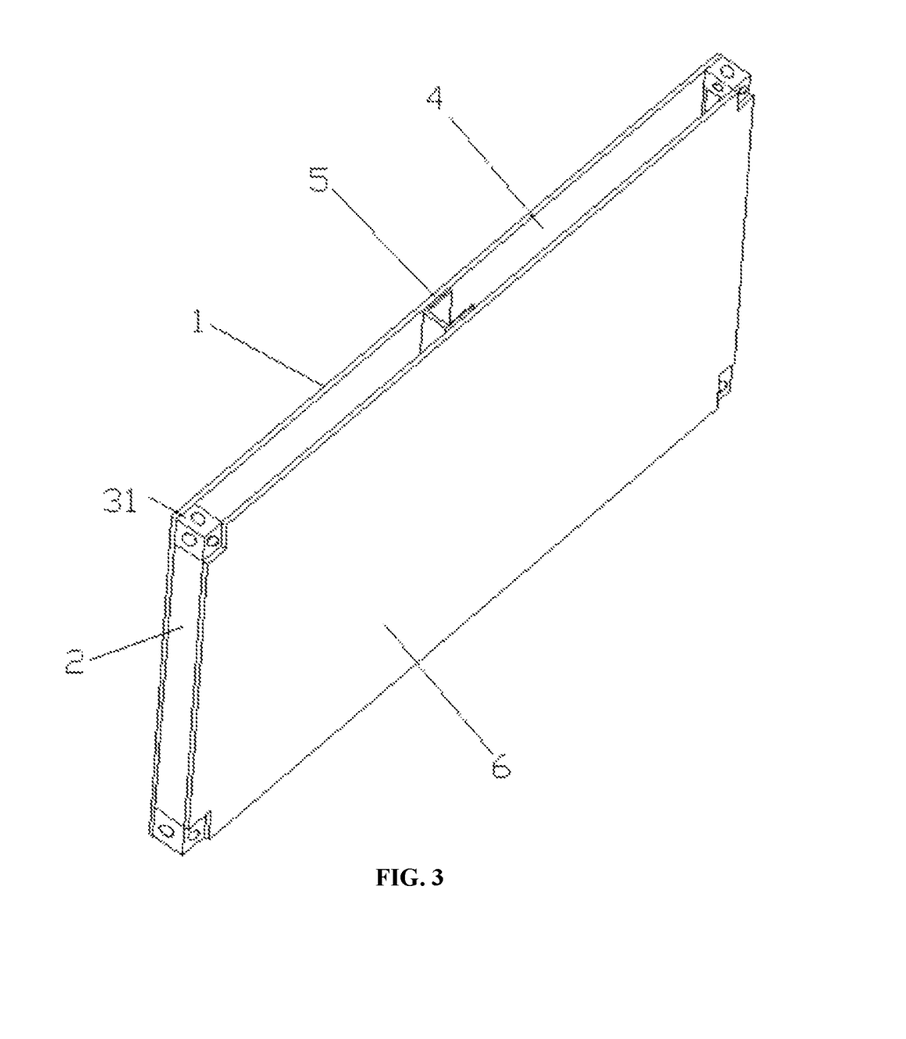
FIG. 3 is another structural schematic diagram of an embodiment.

As shown in FIG. 3, two ends of the structural energy-saving and decorative integrated plate of the present invention may be provided with joint devices for being connected to the wall, the joint devices being arranged at upper and lower ends of the outer side keels and clamped between the outer side decorative plate and the inner side decorative plate, the joint devices being blocked when viewed from the outer side decorative plate towards the inner side decorative plate, and owing to notches at four corners of the inner side decorative plate, the joint devices being exposed when viewed from the inner side decorative plate. In addition to the joint devices, a connection mode customary in an industry may also be used, such as a buckle connection mode, as shown in FIG. 1.

In the present invention, the outer side keels, an inner side keel, and the bottom keel are welded into a wall framework. However, the present invention is not limited to the framework with a shape shown in the accompanying drawings, and the framework may also be built, according to actual requirements of the wall, into various shapes, such as a square, a rectangle, a triangle and a polygon.

The outer side decorative plate of the present invention may be a cement fiber plate, a magnesium oxide plate, etc., the inner side decorative plate may be a cement fiber plate, a bamboo fiber plate, etc., and both decorative plates may be replaced according to actual requirements.

Embodiment 1

A manufacturing method for a structural energy-saving, heat-insulated and decorative integrated plate includes:
   step 1: weld outer side keels, an inner side keel and a bottom keel into a wall framework, the wall framework being capable of being of, according to a shape and a size of a wall, different structures;

step 2: fix an inner side decorative plate and an outer side decorative plate on a front side and a rear side of the wall framework respectively, the inner side decorative plate and the outer side decorative plate being capable of being fixed on the wall framework through shoot nails, or the inner side decorative plate and the outer side decorative plate being capable of being connected to the wall framework through connectors, and a hollow structure formed by the inner side decorative plate, the outer side decorative plate and the wall framework being a filling and pouring layer;

step 3: grout the filling and pouring layer, to form a wall filled with cement foamed polystyrene particles, so that the wall, the inner side decorative plate, the outer side decorative plate and the wall framework may be fixed together after the wall is solidified, where the wall filled with cement foamed polystyrene particles is manufactured as follows: put 210 kg-220 kg of water, 280 kg-290 kg of cement, 100 kg-110 kg of coal ash, 45 kg-48 kg of coal gangue, 2 kg-3 kg of polystyrene particles, 8 kg-9 kg of foaming agents and 3 kg-3.5 kg of 801 glue into a stirrer, and stir uniformly, a stirring speed being 200 r/min-350 r/min and a stirring time being 5 min, to obtain viscous foamed concrete; and step 4: fill the filling and pouring layer with the viscous foamed concrete, leave same standing still for 1.5 h-2 h to achieve initial solidification, and leave same standing still for over 24 h, to obtain a high-strength integrated plate.

Embodiment 2

A manufacturing method for a structural energy-saving, heat-insulated and decorative integrated plate includes:
step 1: weld outer side keels, an inner side keel and a bottom keel into a wall framework, the wall framework being capable of being of, according to a shape and a size of a wall, different structures;

step 2: fix an inner side decorative plate and an outer side decorative plate on a front side and a rear side of the wall framework respectively, the inner side decorative plate and the outer side decorative plate being capable of being fixed on the wall framework through shoot nails, or the inner side decorative plate and the outer side decorative plate being capable of being connected to the wall framework through connectors, and a hollow structure formed by the inner side decorative plate, the outer side decorative plate and the wall framework being a filling and pouring layer;

step 3: grout the filling and pouring layer, to form a wall filled with cement foamed polystyrene particles, so that the wall, the inner side decorative plate, the outer side decorative plate and the wall framework may be fixed together after the wall is solidified, where The wall filled with cement foamed polystyrene particles is manufactured as follows: put 220 kg-235 kg of water, 290 kg-300 kg of cement, 110 kg-115 kg of coal ash, 48 kg-50 kg of coal gangue, 2.5 kg-3.5 kg of polystyrene particles, 8.5 kg-9.5 kg of foaming agents and 3.5 kg-4 kg of 801 glue into a stirrer, and stir uniformly, a stirring speed being 200 r/min-350 r/min and a stirring time being 6 min, to obtain viscous foamed concrete; and step 4: fill the filling and pouring layer with the viscous foamed concrete, leave same standing still for 1.5 h-2 h to achieve initial solidification, and leave same standing still for over 24 h, to obtain a high-strength integrated plate.

Embodiment 3

A manufacturing method for a structural energy-saving, heat-insulated and decorative integrated plate includes:
step 1: weld outer side keels, an inner side keel and a bottom keel into a wall framework, the wall framework being capable of being of, according to a shape and a size of a wall, different structures;

step 2: fix an inner side decorative plate and an outer side decorative plate on a front side and a rear side of the wall framework respectively, the inner side decorative plate and the outer side decorative plate being capable of being fixed on the wall framework through shoot nails, or the inner side decorative plate and the outer side decorative plate being capable of being connected to the wall framework through connectors, and a hollow structure formed by the inner side decorative plate, the outer side decorative plate and the wall framework being a filling and pouring layer;

step 3: grout the filling and pouring layer, to form a wall filled with cement foamed polystyrene particles, so that the wall, the inner side decorative plate, the outer side decorative plate and the wall framework may be fixed together after the wall is solidified, where the wall filled with cement foamed polystyrene particles is manufactured as follows: put 235 kg-240 kg of water, 300 kg-310 kg of cement, 115 kg-125 kg of coal ash, 50 kg-55 kg of coal gangue, 3.5 kg-4.2 kg of polystyrene particles, 9 kg-10 kg of foaming agents and 4 kg-4.5 kg of 801 glue into a stirrer, and stir uniformly, a stirring speed being 200 r/min-350 r/min and a stirring time being 7 min, to obtain viscous foamed concrete; and step 4: fill the filling and pouring layer with the viscous foamed concrete, leave same standing still for 1.5 h-2 h to achieve initial solidification, and leave same standing still for over 24 h, to obtain a high-strength integrated plate.

Embodiment 4

A manufacturing method for a structural energy-saving, heat-insulated and decorative integrated plate includes:
step 1: weld outer side keels, an inner side keel and a bottom keel into a wall framework, the wall framework being capable of being of, according to a shape and a size of a wall, different structures;

step 2: fix an inner side decorative plate and an outer side decorative plate on a front side and a rear side of the wall framework respectively, the inner side decorative plate and the outer side decorative plate being capable of being fixed on the wall framework through shoot nails, or the inner side decorative plate and the outer side decorative plate being capable of being connected to the wall framework through connectors, and a hollow structure formed by the inner side decorative plate, the outer side decorative plate and the wall framework being a filling and pouring layer;

step 3: grout the filling and pouring layer, to form a wall filled with cement foamed polystyrene particles, so that the wall, the inner side decorative plate, the outer side decorative plate and the wall framework may be fixed together after the wall is solidified, where the wall filled with cement foamed polystyrene particles is manufactured as follows: put 240 kg-250 kg of water, 310 kg-320 kg of cement, 125 kg-135 kg of coal ash, 55 kg-60 kg of coal gangue, 4 kg-5 kg of polystyrene particles, 9.5 kg-10 kg of foaming agents and 4 kg-5 kg of 801 glue into a stirrer, and stir uniformly, a stirring speed being 200 r/min-350 r/min and a stirring time being 8 min, to obtain viscous foamed concrete; and step 4: fill the filling and pouring layer with the viscous foamed concrete, leave same standing still for 1.5 h-2 h to achieve initial solidification, and leave same standing still for over 24 h, to obtain a high-strength integrated plate.

Embodiment 5

A manufacturing method for a structural energy-saving, heat-insulated and decorative integrated plate includes:
step 1: weld outer side keels, an inner side keel and a bottom keel into a wall framework, the wall framework being capable of being of, according to a shape and a size of a wall, different structures;
step 2: fix an inner side decorative plate and an outer side decorative plate on a front side and a rear side of the wall framework respectively, the inner side decorative plate and the outer side decorative plate being capable of being fixed on the wall framework through shoot nails, or the inner side decorative plate and the outer side decorative plate being capable of being connected to the wall framework through connectors, and a hollow structure formed by the inner side decorative plate, the outer side decorative plate and the wall framework being a filling and pouring layer;
step 3: grout the filling and pouring layer, to form a wall filled with cement foamed polystyrene particles, so that the wall, the inner side decorative plate, the outer side decorative plate and the wall framework may be fixed together after the wall is solidified, where the wall filled with cement foamed polystyrene particles is manufactured as follows: put 360 kg-365 kg of water, 450 kg-460 kg of cement, 250 kg-260 kg of coal ash, 2 kg-3 kg of polystyrene particles, 8 kg-9 kg of foaming agents and 4 kg-4.8 kg of 801 glue into a stirrer, and stir uniformly, a stirring speed being 200 r/min-350 r/min and a stirring time being 6 min, to obtain viscous foamed concrete; and
step 4: fill the filling and pouring layer with the viscous foamed concrete, leave same standing still for 1.5 h-2 h to achieve initial solidification, and leave same standing still for over 24 h, to obtain a high-strength integrated plate.

Embodiment 6

A manufacturing method for a structural energy-saving, heat-insulated and decorative integrated plate includes:
step 1: weld outer side keels, an inner side keel and a bottom keel into a wall framework, the wall framework being capable of being of, according to a shape and a size of a wall, different structures;
step 2: fix an inner side decorative plate and an outer side decorative plate on a front side and a rear side of the wall framework respectively, the inner side decorative plate and the outer side decorative plate being capable of being fixed on the wall framework through shoot nails, or the inner side decorative plate and the outer side decorative plate being capable of being connected to the wall framework through connectors, and a hollow structure formed by the inner side decorative plate, the outer side decorative plate and the wall framework being a filling and pouring layer;
step 3: grout the filling and pouring layer, to form a wall filled with cement foamed polystyrene particles, so that the wall, the inner side decorative plate, the outer side decorative plate and the wall framework may be fixed together after the wall is solidified, where the wall filled with cement foamed polystyrene particles is manufactured as follows: put 365 kg-372 kg of water, 460 kg-470 kg of cement, 255 kg-270 kg of coal ash, 2.8 kg-3.6 kg of polystyrene particles, 8.5 kg-10 kg of foaming agents and 4.5 kg-5.2 kg of 801 glue into a stirrer, and stir uniformly, a stirring speed being 200 r/min-350 r/min and a stirring time being 7 min, to obtain viscous foamed concrete; and
step 4: fill the filling and pouring layer with the viscous foamed concrete, leave same standing still for 1.5 h-2 h to achieve initial solidification, and leave same standing still for over 24 h, to obtain a high-strength integrated plate.

Embodiment 7

A manufacturing method for a structural energy-saving, heat-insulated and decorative integrated plate includes:
step 1: weld outer side keels, an inner side keel and a bottom keel into a wall framework, the wall framework being capable of being of, according to a shape and a size of a wall, different structures;
step 2: fix an inner side decorative plate and an outer side decorative plate on a front side and a rear side of the wall framework respectively, the inner side decorative plate and the outer side decorative plate being capable of being fixed on the wall framework through shoot nails, or the inner side decorative plate and the outer side decorative plate being capable of being connected to the wall framework through connectors, and a hollow structure formed by the inner side decorative plate, the outer side decorative plate and the wall framework being a filling and pouring layer;
step 3: grout the filling and pouring layer, to form a wall filled with cement foamed polystyrene particles, so that the wall, the inner side decorative plate, the outer side decorative plate and the wall framework may be fixed together after the wall is solidified, where the wall filled with cement foamed polystyrene particles is manufactured as follows: put 370 kg-375 kg of water, 470 kg-485 kg of cement, 260 kg-275 kg of coal ash, 3 kg-4 kg of polystyrene particles, 10 kg-10.5 kg of foaming agents and 5 kg-5.5 kg of 801 glue into a stirrer, and stir uniformly, a stirring speed being 200 r/min-350 r/min and a stirring time being 8 min, to obtain viscous foamed concrete; and
step 4: fill the filling and pouring layer with the viscous foamed concrete, leave same standing still for 1.5 h-2 h to achieve initial solidification, and leave same standing still for over 24 h, to obtain a high-strength integrated plate.

Embodiment 8

A manufacturing method for a structural energy-saving, heat-insulated and decorative integrated plate includes:
step 1: weld outer side keels, an inner side keel and a bottom keel into a wall framework, the wall framework being capable of being of, according to a shape and a size of a wall, different structures;

step 2: fix an inner side decorative plate and an outer side decorative plate on a front side and a rear side of the wall framework respectively, the inner side decorative plate and the outer side decorative plate being capable of being fixed on the wall framework through shoot nails, or the inner side decorative plate and the outer side decorative plate being capable of being connected to the wall framework through connectors, and a hollow structure formed by the inner side decorative plate, the outer side decorative plate and the wall framework being a filling and pouring layer;

step 3: grout the filling and pouring layer, to form a wall filled with cement foamed polystyrene particles, so that the wall, the inner side decorative plate, the outer side decorative plate and the wall framework may be fixed together after the wall is solidified, where the wall filled with cement foamed polystyrene particles is manufactured as follows: put 375 kg-380 kg of water, 485 kg-500 kg of cement, 275 kg-300 kg of coal ash, 4 kg-5 kg of polystyrene particles, 10 kg-11 kg of foaming agents and 5.5 kg-6 kg of 801 glue into a stirrer, and stir uniformly, a stirring speed being 200 r/min-350 r/min and a stirring time being 9 min, to obtain viscous foamed concrete; and step 4: fill the filling and pouring layer with the viscous foamed concrete, leave same standing still for 1.5 h-2 h to achieve initial solidification, and leave same standing still for over 24 h, to obtain a high-strength integrated plate.

In Embodiments 1-4, formulas for preparing 500 kg per cubic meter of wall filled with cement foamed polystyrene particles are provided, where the optimal proportion range is in Embodiment 3. In Embodiments 5-8, formulas for preparing 800 kg-850 kg per cubic meter of wall filled with cement foamed polystyrene particles are provided, where the optimal proportion range is in Embodiment 7.

Detection data of the wall filled with cement foamed polystyrene particles are as follows:

| Item | | Technical performance index | |
|---|---|---|---|
| | | Wall in prior art | Wall in present invention |
| Strength level | — | A5 | A5 |
| Dry density level | 1 | B05 | B05 |
| Surface density 180 mm | Kg/m$^2$ | ≤1000 | ≤1200 |
| Shock resistance | 1 | ≥8 | ≥10 |
| Hanging force | N | 920 | 1000 |
| Weighted transmission loss of airborne sound 180 mm | dB | ≥32 | ≥48 |
| Dry density | Kg/m$^3$ | ≤1421 | ≤1141 |
| Softening coefficient | — | 0.85 | 0.98 |
| Moisture content | % | 7.4 | 3.9 |
| Average value of compressive strength | MPa | ≥4.1 | ≥5.0 |
| Heat conduction coefficient (at average temperature of 25° C.) | W/(m · K) | ≤0.4 | ≤0.21 |
| Freezing resistance (freezing and thawing cycle) | D25 | no breaks, cracks, or delamination | no breaks, cracks, or delamination |
| Radioactive element limit | 1 | ≤2.0 | ≤1.0 |
| Heat resistance of composite wall | m2 · K/W | ≥1.3 | ≥2.5 |
| Item | | Wall in prior art | Wall of present invention |
| (Fire resistance, freezing-thawing resistance) | Fire resistance limit (integrity) | Without integrity after 150 min | With integrity after 240 min |
| | Fire resistance limit (heat insulation property) | an average temperature rise of an unexposed surface of a test piece within 150 min is 35° C., and the maximum temperature of the unexposed surface of the test piece is 42. 3° C. | an average temperature rise of an unexposed surface of a test piece within 240 min is 29.0° C., and the maximum temperature of the unexposed surface of the test piece is 31.4° C. |
| | Freezing-thawing resistance | with hollows, glue falling, or cracks after 16 freezing and thawing cycles | without hollows, glue falling, or cracks after 30 freezing and thawing cycles |
| Flexibility | Compressive strength/flexural strength (cement-based) | ≤1.2 | ≤3.0 |
| Operable time/h | | 4-7.5 | 1.5-4.0 |

The structural energy-saving and decorative integrated plate prepared in the proportion described above uses fewer common raw materials, and features a low manufacture cost and a simple preparation process, so that a production efficiency is improved. In addition, the structural energy-saving and decorative integrated plate features a light self weight, with the lowest self weight of 300 kg-400 kg per cubic meter. The polystyrene particles are better dispersed with better bonding strength in cement paste, so that the wall has an obvious shock and energy absorption effect, compressive strength over 5.0 MPa, a heat conduction coefficient less than 0.21, and a heat insulation property far superior to a decorative integrated plate of a common foamed concrete wall. Moreover, a heat insulation effect is 8 to 10 times that of a common brick wall. After the framework formed by the wall, the inner side decorative plate, the outer side decorative plate, the inner side keel, the outer side keels and the bottom keel is cured into a whole, composite compressive strength is over 7.0 MPa, and a composite sound insulation effect is over 62 dB. Fire prevention and resistance reaches the level A1, an average temperature rise of an unexposed surface of the structural energy-saving and decorative integrated plate within 240 min is 26.0° C., and the maximum temperature rise is 30.1° C., so that the integrated plate features a fire prevention property far superior to a common decorative wall.

What is claimed is:

1. A manufacturing method for a structural energy-saving, heat-insulated and decorative integrated plate, comprising the steps of:
   welding outer side keels, an inner side keel and a bottom keel into a wall framework, the wall framework being capable of being of, according to a shape and a size of a wall, different structures;
   fixing an inner side decorative plate and an outer side decorative plate on a front side and a rear side of the wall framework respectively, the inner side decorative plate and the outer side decorative plate being capable of being fixed on the wall framework through shoot nails, or the inner side decorative plate and the outer side decorative plate being capable of being connected to the wall framework through connectors, and a hollow structure formed by the inner side decorative plate, the outer side decorative plate and the wall framework being a filling and pouring layer; and
   grouting the filling and pouring layer, to form a wall filled with cement foamed polystyrene particles, so that the wall, the inner side decorative plate, the outer side decorative plate and the wall framework are fixed together after the wall filled with cement foamed polystyrene particles is solidified;
   wherein the wall filled with cement foamed polystyrene particles comprises: 210 kg-250 kg of water, 280 kg-320 kg of cement, 100 kg-130 kg of coal ash, 45 kg-60 kg of coal gangue and 2 kg-5 kg of polystyrene particles; and the wall is manufactured as follows:
   step A: adding the cement, the coal ash, the coal gangue, the polystyrene particles, foaming agents, and 801 glue into the water at a normal temperature, and uniformly stirring the cement, the coal ash, the coal gangue, the polystyrene particles, the foaming agents, the 801 glue, and the water in a stirrer for 5 min-8 min at a stirring speed of 200 r/min-350 r/min, to obtain foamed concrete; and
   step B: filling the filling and pouring layer with the foamed concrete obtained in the step A, leaving the filling and pouring layer filled with the foamed concrete standing still for 1.5 h-2 h to obtain an initial solidification product, and leaving the initial solidification product standing still for over 24 h to obtain the structural energy-saving, heat-insulated and decorative integrated plate.

2. The manufacturing method for the structural energy-saving, heat-insulated and decorative integrated plate according to claim 1, wherein a dosage of the foaming agents is 8 kg-10 kg.

3. The manufacturing method for the structural energy-saving, heat-insulated and decorative integrated plate according to claim 1, wherein a dosage of the 801 glue is 3 kg-5 kg.

4. A manufacturing method for a structural energy-saving, heat-insulated and decorative integrated plate, comprising:
   welding outer side keels, an inner side keel and a bottom keel into a wall framework, the wall framework being capable of being of, according to a shape and a size of a wall, different structures;
   fixing an inner side decorative plate and an outer side decorative plate on a front side and a rear side of the wall framework respectively, the inner side decorative plate and the outer side decorative plate being capable of being fixed on the wall framework through shoot nails, or the inner side decorative plate and the outer side decorative plate being capable of being connected to the wall framework through connectors, and a hollow structure formed by the inner side decorative plate, the outer side decorative plate, and the wall framework being a filling and pouring layer; and
   grouting the filling and pouring layer, to form a wall filled with cement foamed polystyrene particles, so that the wall, the inner side decorative plate, the outer side decorative plate, and the wall framework are fixed together after the wall filled with cement foamed polystyrene particles is solidified;
   wherein the wall filled with cement foamed polystyrene particles comprises: 360 kg-380 kg of water, 450 kg-500 kg of cement, 250 kg-300 kg of coal ash and 2 kg-5 kg of polystyrene particles; and the wall is manufactured as follows:
   step A: adding the cement, the coal ash, the polystyrene particles, foaming agents, and 801 glue into the water at a normal temperature, and uniformly stirring the cement, the coal ash, the polystyrene particles, the foaming agents, the 801 glue, and the water in a stirrer for 6-15 min at a stirring speed of 200 r/min-350 r/min to obtain foamed concrete;
   step B: filling the filling and pouring layer with the foamed concrete obtained in the step A, leaving the filling and pouring layer filled with the foamed concrete standing still for 1.8 h-2.5 h to obtain an initial solidification product, and leaving the initial solidification product standing still for over 24 h to obtain the structural energy-saving, heat-insulated and decorative integrated plate.

5. The manufacturing method for the structural energy-saving, heat-insulated and decorative integrated plate according to claim 4, wherein a dosage of the foaming agents is 8 kg-11 kg.

6. The manufacturing method for the structural energy-saving, heat-insulated and decorative integrated plate according to claim 4, wherein a dosage of the 801 glue is 4 kg-6 kg.

* * * * *